(12) United States Patent
Hennings Yeomans et al.

(10) Patent No.: US 11,556,745 B2
(45) Date of Patent: Jan. 17, 2023

(54) SYSTEM AND METHOD FOR ORDERED REPRESENTATION AND FEATURE EXTRACTION FOR POINT CLOUDS OBTAINED BY DETECTION AND RANGING SENSOR

(71) Applicants: Pablo Horacio Hennings Yeomans, Toronto (CA); Martin Ivanov Gerdzhev, Toronto (CA)

(72) Inventors: Pablo Horacio Hennings Yeomans, Toronto (CA); Martin Ivanov Gerdzhev, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 971 days.

(21) Appl. No.: 16/362,261

(22) Filed: Mar. 22, 2019

(65) Prior Publication Data

US 2020/0302237 A1    Sep. 24, 2020

(51) Int. Cl.
*G06K 9/62* (2022.01)
*G01S 13/89* (2006.01)
(Continued)

(52) U.S. Cl.
CPC .......... *G06K 9/6261* (2013.01); *G01S 13/89* (2013.01); *G01S 17/89* (2013.01); *G06V 10/457* (2022.01);
(Continued)

(58) Field of Classification Search
CPC ..... G06K 9/6261; G06V 20/56; G05D 1/0088
See application file for complete search history.

(56) References Cited

U.S. PATENT DOCUMENTS 9,315,192 B1  4/2016  Zhu et al.
2003/0020713 A1*  1/2003  Chang .................... G06T 17/00
                                                        345/421
(Continued)

FOREIGN PATENT DOCUMENTS

CN    102855663 A    1/2013
CN    103106632 A    5/2013
(Continued)

OTHER PUBLICATIONS

Huilin Yin et al. Spherical Coordinates Based Methods of Ground Extraction and Objects Segmentation Using 3-D LiDAR Sensor, IEEE Intelligent Transportation Systems Magazine, 2016, pp. 61-68.
(Continued)

*Primary Examiner* — Myron Wyche

(57) ABSTRACT

A method is described which includes receiving a point cloud having a plurality of data points each representing a 3D location in a 3D space, the point cloud being obtained using a detection and ranging (DAR) sensor. For each data point, associating the data point with a 3D volume containing the 3D location of the data point, the 3D volume being defined using a 3D lattice that partitions the 3D space based on spherical coordinates. For at least one 3D volume, the data points are sorted within the 3D volume based on at least one dimension of the 3D lattice; and the sorted data points are stored as a set of ordered data points. The method also includes performing feature extraction on the set of ordered data points to generate a set of ordered feature vectors and providing the set of ordered feature vectors to perform a machine learning inference task.

23 Claims, 8 Drawing Sheets

(51) Int. Cl.
    *G01S 17/89*      (2020.01)
    *G06V 10/44*      (2022.01)
    *G06V 20/64*      (2022.01)
    *G05D 1/00*       (2006.01)
    *G06V 20/56*      (2022.01)

(52) U.S. Cl.
    CPC ........... *G06V 20/64* (2022.01); *G05D 1/0088* (2013.01); *G06V 20/56* (2022.01)

(56) References Cited

U.S. PATENT DOCUMENTS

| | | | |
|---|---|---|---|
| 2010/0284572 | A1 | 11/2010 | Lukas et al. |
| 2017/0263052 | A1* | 9/2017 | Turner ....................... G06T 7/90 |
| 2018/0259640 | A1* | 9/2018 | Correia ................. B60W 30/17 |
| 2019/0147302 | A1* | 5/2019 | Jampani ............... G06K 9/6274 382/156 |
| 2020/0151557 | A1* | 5/2020 | Nezhadarya ......... G06N 3/0454 |

FOREIGN PATENT DOCUMENTS

| | | |
|---|---|---|
| CN | 103679807 A | 3/2014 |
| CN | 104036544 A | 9/2014 |
| CN | 105719249 A | 6/2016 |
| CN | 106651926 A | 5/2017 |
| CN | 107016725 A | 8/2017 |
| CN | 107610216 A | 1/2018 |
| CN | 108010116 A | 5/2018 |
| CN | 108345831 A | 7/2018 |
| CN | 108564650 A | 9/2018 |
| CN | 109086786 A | 12/2018 |
| CN | 109307478 A | 2/2019 |
| DE | 102017203838 A1 | 9/2018 |
| EP | 2249311 A1 | 11/2010 |
| EP | 3223191 A1 | 9/2017 |
| JP | 2002333312 A | 11/2002 |
| KR | 101767653 B1 | 8/2017 |

OTHER PUBLICATIONS

Wang Lei, "Research and Realization of Urban Airborne LiDAR Mapping Platform System", 2014, 5 pages (with an English abstract).
A. Geiger, P. Lenz, and R. Urtasun, Vision Recognition, Pattern, and 2012, "Are we ready for Autonomous Driving? The KITTI Vision Benchmark Suite", CVPR, 2012.
S. Salti, F. Tombari, and L. Di Stefano, "SHOT: Unique signatures of histograms for surface and texture description", Computer Vision and Image Understanding, vol. 125, pp. 251-264, 2014.
D. Maturana and S. Scherer, "VoxNet: A 3D Convolutional Neural Network for Real-Time Object Recognition", in 2015 IEEE/RSJ International Conference on Intelligent Robots and Systems (IROS), 2015, pp. 922-928, IEEE.
B. Li, "3D Fully Convolutional Network for Vehicle Detection in Point Cloud", IROS, pp. 1513-1518, 2017.
Y. Zhou and O. Tuzel, "VoxelNet: End-to-End Learning for Point Cloud Based 3D Object Detection", CVPR, 2018.
D. Z. Wang and I. Posner, "Voting for Voting in Online Point Cloud Object Detection", Robotics—Science and Systems, 2015.
M. Engelcke, D. Rao, D. Z. Wang, C. H. Tong, and I. Posner, "Vote3Deep: Fast Object Detection in 3D Point Clouds Using Efficient Convolutional Neural Networks", CoRR, vol. cs.RO, 2016.
C. R. Qi, H. Su, M. Niessner, A. Dai, M. Yan, and L. J. Guibas, "Volumetric and Multi-View CNNs for Object Classification on 3D Data", CVPR, pp. 5648-5656, 2016.
Y. Yan, Y. Mao, and B. Li, "SECOND: Sparsely Embedded Convolutional Detection", Sensors, vol. 18, No. 10, pp. 3337, 2018.
W. Ali, S. Abdelkarim, M. Zahran, M. Zidan, and A. El Sallab, "YOLO3D: End-to-end real-time 3D Oriented Object Bounding Box Detection from LiDAR Point Cloud", arXiv.org, Aug. 2018.
A. Asvadi, L. Garrote, C. Premebida, P. Peixoto, and U. J. Nunes, "DepthCN: Vehicle Detection Using 3D-LIDAR and ConvNet", ITSC, pp. 1-6, 2017.
J. Ku, M. Mozifian, J. Lee, A. Harakeh, and S. L. Waslander, "Joint 3D Proposal Generation and Object Detection from View Aggregation," IROS, 2018.
B. Wu, X. Zhou, S. Zhao, X. Yue, and K. Keutzer, "SqueezeSegV2: Improved Model Structure and Unsupervised Domain Adaptation for Road-Object Segmentation from a LiDAR Point Cloud", arXiv.org, Sep. 2018.
B. Li, T. Zhang, and T. Xia, "Vehicle Detection from 3D Lidar Using Fully Convolutional Network", CoRR, 2016.
M. Liang, B. Yang, S. Wang, and R. Urtasun, "Deep Continuous Fusion for Multi-Sensor 3D Object Detection", ECCV, vol. 11220, No. Chapter 39, pp. 663-678, 2018.
B. Yang, M. Liang, and R. Urtasun, "HDNET: Exploiting HD Maps for 3D Object Detection", CoRL, 2018.
F. N. Iandola, S. Han, M. W. Moskewicz, K. Ashraf, W. J. Dally, and K. Keutzer, "SqueezeNet: AlexNet-Level Accuracy with 50X Fewer Parameters and <0.5MB Model Size", arXiv.org, Feb. 2016.
X. Chen, H. Ma, J. Wan, B. Li, and T. Xia, "Multi-View 3D Object Detection Network for Autonomous Driving", arXiv.org, Nov. 2016.
V. Hegde and R. Zadeh, "FusionNet: 3D Object Classification Using Multiple Data Representations", CoRR, 2016.
C. R. Qi, W. Liu, C. Wu, H. Su, and L. J. Guibas, "Frustum PointNets for 3D Object Detection from RGB-D Data", CVPR, 2018.
K. Shin, Y. P. Kwon, and M. Tomizuka, "RoarNet: A Robust 3D Object Detection based on RegiOn Approximation Refinement", arXiv.org, Nov. 2018.

* cited by examiner

SYSTEM AND METHOD FOR ORDERED REPRESENTATION AND FEATURE EXTRACTION FOR POINT CLOUDS OBTAINED BY DETECTION AND RANGING SENSOR

FIELD

The present disclosure relates to systems and methods for generating an ordered representation of point clouds provided by a detection and ranging (DAR) sensor, which may help with performing coherent feature extraction therefrom.

BACKGROUND

Autonomous vehicles generally include different types of sensors that may be used to sense an environment the vehicle operates in, to capture information about the environment, and produce sensor data representative of the captured information. One type of sensor that is becoming prevalent on autonomous vehicles is a LiDAR sensor. A LiDAR sensor captures three-dimensional (3D) information about objects in the environment the vehicle operates in, and produces sets of data points in space that are representative of the objects. Each set of data points in three-dimensional (3D) space is generally referred to in the art as a point cloud. However, the set of data points in a point cloud are typically unordered data points, with irregular formation and reflecting a non-uniform sampling density in 3D space.

Autonomous vehicles generally include a machine learning-based system that can perform a feature extraction procedure to extract features from point clouds obtained by LiDAR sensors which are used by downstream inference procedure(s) of the machine-learning based system to perform pattern recognition tasks, such as 3D object recognition and semantic segmentation. However, conventional feature extraction procedures may not account for the ray-scanning or ranging procedure that a LiDAR sensor uses to produce point clouds. In particular, point clouds received from a LiDAR sensor are not natural 3D surfaces that have been sampled as if the LiDAR sensor can be placed looking from every direction. Rather, the LiDAR sensor is typically affixed to the vehicle and scans only a limited field of view producing as many data points as it can scan from such direction. Furthermore, the point cloud produced by the LiDAR sensor from each scan conforms to a spatial ordering that is typically custom to the LiDAR sensor and not properly accounted for in downstream inference procedure(s) used to perform downstream pattern recognition tasks.

SUMMARY

The present disclosure is directed to a feature extraction method and grid representation based on the point cloud formation process using spherical coordinates to partition a 3D space of an environment sensed or scanned by the DAR sensor into small volumes (otherwise known as "3D bins"), and order the data points of the point cloud within each small volume (e.g. 3D bin) to perform coherent feature extraction in a signal processing sense in an efficient way. This novel representation defines the 3D space for a wide class of relevant pattern recognition tasks, including, but not limited to, object detection and semantic segmentation. Performing reliably on these pattern recognition tasks is crucial to autonomous vehicles.

The present disclosure describes examples of a method and system for organizing data points of a point cloud provided by a DAR sensor, such as a radar sensor or a LiDAR sensor, to enable extraction of features from the point cloud that can account for edges, corners and other object characteristics that require knowledge of the order of the data points in the point cloud. To perform feature extraction on the data points of a point cloud, and take into account the process by which a DAR sensor generated the point clouds.

In some examples, a point cloud received from a DAR sensor is converted into a set of ordered feature vectors (or augmented data points) and metadata using a 3D spherical grid representation of the 3D space of an environment sensed or scanned by the DAR sensor. The disclosed examples may enable more effective pattern recognition, such as object detection and semantic segmentation, by an inference sub-module of a machine learning-based system, for example, a machine learning-based system in autonomous vehicles.

In some aspects, the processing of data points of point clouds according to (1) a 3D grid representation in spherical coordinates that includes an ordering of the data points within each 3D bin the grid encompasses, and (2) feature extraction operations that convert the data points in each 3D bin into feature vectors that use the spatial ordering of the data points and related metadata.

In accordance with one aspect of the present disclosure, there is provided a method that includes receiving a point cloud having a plurality of data points each representing a 3D location in a 3D space, the point cloud being obtained using a detection and ranging (DAR) sensor. For each data point, associating the data point with a 3D volume containing the 3D location of the data point, the 3D volume being defined using a 3D lattice that partitions the 3D space based on spherical coordinates. For at least one 3D volume, the method includes sorting the data points within the 3D volume based on at least one dimension of the 3D lattice, and storing the sorted data points as a set of ordered data points.

In accordance with a further aspect of the present disclosure, the 3D volume comprises two or more partitions of the 3D space, the two or more partitions being adjacent partitions along one dimension of the 3D lattice.

In accordance with a further aspect of the present disclosure, the method includes performing feature extraction on the set of ordered data points to generate a set of ordered feature vectors, and providing the set of ordered feature vectors to perform an inference task.

In accordance with a further aspect of the present disclosure, performing feature extraction comprises for the at least one 3D volume, calculating at least one feature for each data point within the 3D volume by applying at least one feature function, generating a feature vector for each respective data point by associating the at least one calculated feature with the respective data point, and sorting the feature vectors based on the 3D lattice to generate the set of ordered feature vectors.

In accordance with a further aspect of the present disclosure, performing feature extraction further comprises for the at least one 3D volume, determining neighborhood information for each data point according to at least one local pattern, wherein the neighborhood information is used in applying the at least one feature function.

In accordance with a further aspect of the present disclosure, the set of ordered feature vectors is represented as a set of tuples in which each feature vector is associated with a respective partition of the 3D space.

In accordance with a further aspect of the present disclosure, the 3D space is partitioned into a plurality of non-overlapping 3D volumes.

In accordance with a further aspect of the present disclosure, the 3D space is partitioned into a plurality of overlapping 3D volumes.

In accordance with a further aspect of the present disclosure, wherein the DAR sensor is a ray-scanning DAR sensor.

In accordance with another aspect of the present disclosure, there is provided an apparatus comprising a memory storing instructions, and a processor coupled to the memory and configured to execute the instructions to: receive a point cloud having a plurality of data points each representing a 3D location in a 3D space, the point cloud being obtained using a detection and ranging (DAR) sensor; for each data point, associate the data point with a 3D volume containing the 3D location of the data point, the 3D volume being defined using a 3D lattice that partitions the 3D space based on polar coordinates; for at least one 3D volume, sort the data points within the 3D volume based on at least one dimension of the 3D lattice; and store the sorted data points as a set of ordered data points.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
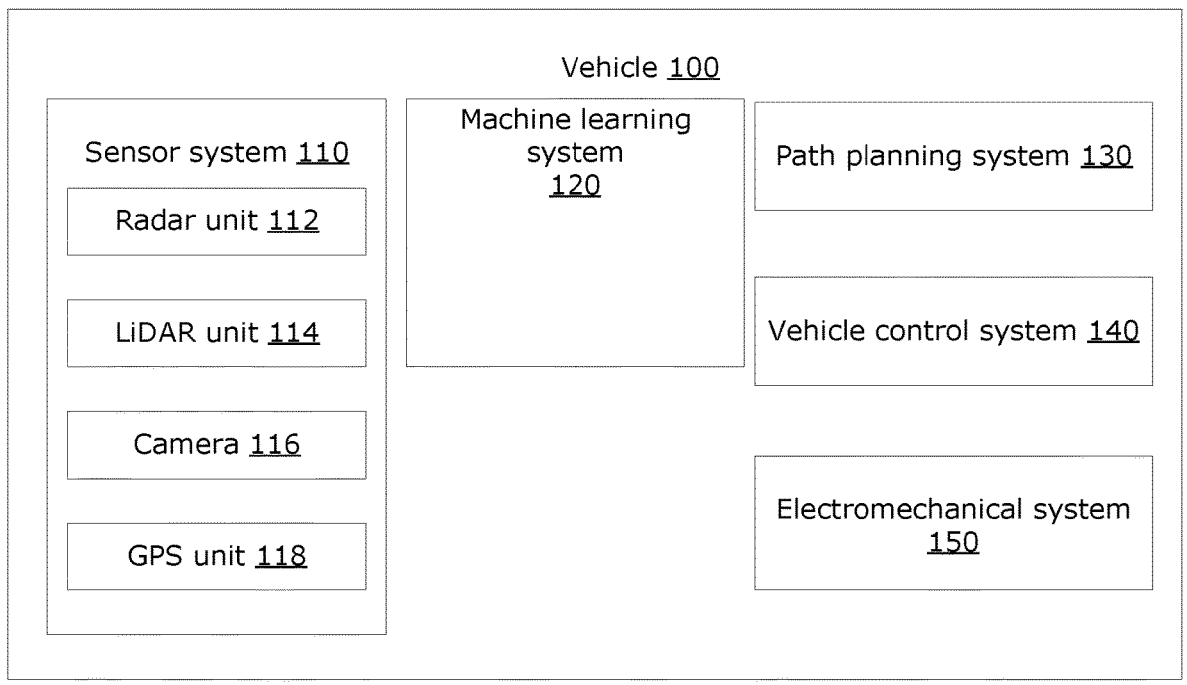
FIG. 1 is a block diagram illustrating some components of an example autonomous vehicle.

The present disclosure describes examples of generating an ordered representation and performing feature extraction on a 3D point cloud received from any detection and ranging sensor, such as a LiDAR sensor, radar sensor, sonar sensor and the like. In the present disclosure, a detection and ranging (DAR) sensor refers to any sensor that may be used to an electromagnetic, optical, or acoustic signal and capture information about objects that are at a distance from the DAR sensor, including information about a distance to or range of each object. A DAR sensor may be a ray-scanning DAR sensor, for example, which may scan the environment using a ray emitted by the DAR sensor. Examples described herein make use of 3D lattices to encode spatial location by grouping points into small volumes. Within each small volume, data points are ordered, and each data point is assigned to the small volume. Features can be computed within each small volume to augment the data points. These computed features and 3D lattice representation of the data points of the point cloud may be used by inference sub-module of a machine learning based system that performs an inference task, such as a pattern recognition task, (i.e. tasks that involve detection of objects or semantic scene segmentation). For example, using examples disclosed herein, data points of a point cloud received from a DAR sensor may be processed to output a set of ordered data points and metadata related to known spatial neighborhood membership, according to a predefined grid. The ordered data points may be augmented with extracted features using metadata related to their spatial neighborhood membership. The set of augmented data points, which is a feature vector that preserves the order of data points of the point cloud, may then be provided as input to an inference sub-module of a machine learning-based system.

Generally, performing ordering of data points of a point cloud and feature extraction on the point cloud, before it is processed by an inference sub-module of a machine learning-based system, may help to improve the performance of an inference task, such as object detection (e.g., detecting pedestrians, or road segmentation (in the context of an autonomous vehicle)), object classification, semantic segmentation, and the like.

Some examples of the present disclosure are described in the context of autonomous vehicles. However, the methods and systems disclosed herein may also be suitable for implementation outside of autonomous devices, for example in the context of non-vehicular devices and/or semi-autonomous devices. For example, any machine learning-based system that receives point clouds and outputs inference decisions may benefit from the ability to give order to the data points of the point clouds during operation. Further, examples of the present disclosure may be used for generating ordered point cloud in other contexts.

Although examples described herein may refer to a car as the autonomous vehicle, the teachings of the present disclosure may be relevant to other forms of autonomous or semi-autonomous devices including, for example, trams, subways, trucks, buses, surface and submersible watercraft and ships, aircraft, drones (also called unmanned aerial vehicles (UAVs)), warehouse equipment, construction equipment or farm equipment, and may include vehicles that do not carry passengers as well as vehicles that do carry passengers. The methods and systems disclosed herein may also be relevant to non-vehicular devices, for example autonomous vacuum cleaners and lawn mowers. Further, although examples described herein may refer to sensors such as LiDAR and radar, it should be understood that the teachings of the present disclosure may be relevant to other forms of DAR devices, include ray-scanning devices that may be found in the above-noted autonomous or semi-autonomous devices.

FIG. 1 is a block diagram illustrating certain components of an example autonomous vehicle 100. Although described as being autonomous, the vehicle 100 may be operable in a fully-autonomous, semi-autonomous or fully user-controlled mode. In the present disclosure, the vehicle 100 is described in the embodiment of a car; however the present disclosure may be implemented in other vehicular or non-vehicular machines, as discussed above.

The vehicle 100 includes a sensor system 110, a machine learning system 120, a path planning system 130, a vehicle control system 140 and an electromechanical system 150, for example. Other systems and components may be included in the vehicle 100 as appropriate. Various systems and components of the vehicle may communicate with each other, for example through wired or wireless communication. For example, the sensor system 110 may communicate with the machine learning-based system 120, path planning system 130 and the vehicle control system 140; the machine learning-based system 120 may communicate with the path planning system 130 and the vehicle control system 140; the path planning system 130 may communicate with the vehicle control system 140; and the vehicle control system 140 may communicate with the mechanical system 150.

The sensor system 110 includes various sensing units for collecting information about the internal and/or external environment of the vehicle 100. In the example shown, the sensor system 110 includes a radar unit 112, a LiDAR unit 114, a camera 116 and a global positioning system (GPS) unit 118. The sensor system 110 may include other sensing units, such as a temperature sensor, precipitation sensor or microphone, among other possibilities.

In example embodiments, LiDAR unit 114 may include one or more LiDAR sensors and may capture data in a wide view (e.g., 360° view) about the vehicle 100. The LiDAR data (e.g., the raw sensor data acquired by the LiDAR sensor(s)) may incorporate three-dimensional (3D) information about the environment, and may be processed to form a set of data points in 3D space (referred to hereinafter as a point cloud), where each data point in the point cloud represents the 3D coordinates (e.g., x, y and z values) of an object sensed by the one or more LiDAR sensors in 3D space. The set of data points in a point cloud may be irregularly spaced, depending on the sensed environment. In some examples, in addition to 3D coordinates, each data point in the point cloud may also contain other information, such as intensity of the data points (e.g. the intensity of the reflected light) or time of detection of the data point.

In example embodiments, radar unit 112 may include one or more radar sensors and may capture data in a wide view (e.g., 360° view) about the vehicle 100. The radar data (e.g., the raw sensor data acquired by the radar sensor(s)) may incorporate three-dimensional (3D) information about the environment, and may also be processed to form a point cloud, where each data point in the point cloud represents the 3D coordinates (e.g., x, y and z values) of an object sensed by the one or more radar sensor in 3D space. The set of data points in a point cloud may be irregularly spaced, depending on the sensed environment. In some examples, in addition to 3D coordinates, each data point in the point cloud may also contain other information, such as intensity of the data point (e.g., the intensity of the reflected electromagnetic wave) or time of detection of the data point.

Using the various sensing units 112, 114, 116, 118, the sensor system 110 may collect information about the local environment of the vehicle 100 (e.g., any immediately surrounding obstacles) as well as information from a wider vicinity (e.g., the radar unit 112 and LiDAR unit 114 may collect information from an area of up to 100 m radius or more around the vehicle 100). The sensor system 110 may also collect information about the position and orientation of the vehicle 100 relative to a frame of reference (e.g., using the GPS unit 118).

The sensor system 110 communicates with the machine learning-based system 120 to provide point clouds to the machine learning-based system 120. The input to the machine learning-based system 120 is the data points of a point cloud received from the sensor system 110. The machine learning-based system 120 is configured to process the data points of point clouds, perform feature extraction, and perform an inference task, such as object classification, regression, or segmentation. The machine learning system 120 may be implemented using software, which may include any number of independent or interconnected modules or functions, for example including machine learning algorithms and image processing functions. The machine learning system 120 may be implemented using one or more dedicated image processing units, or may be implemented using one or more general processing units of the vehicle 100. The machine learning system 120 may repeatedly (e.g., in regular intervals) receive point clouds from the sensor system 110, and process the point clouds in real-time or near real-time. The output of the machine learning-based system 120 is an inference decision, which may include, for example, identification and localization of objects surrounding the vehicle, including object class, object location and object boundary or mask, in 2D and/or 3D space.

In some embodiments, the point clouds provided by the sensor system 110 may be stored in off-line storage, retrieved at a later time, and provided to the machine-learning based system 120 for processing as described above.

Point clouds provided by the sensor system 110 are processed by the machine learning-based system 120, which may provide inference outputs (e.g. object labels, object classes, etc.) to the path planning system 130. The path planning system 130 generates target objectives for the vehicle (e.g., planned paths for the vehicle) and provide the target objectives to the vehicle controls system 140. The vehicle control system 140 serves to control operation of the vehicle 100 based on target objectives received from the path planning system 130. The vehicle control system 140 may be used to provide full, partial or assistive control of the vehicle 100. The electromechanical system 150 receives control signals from the vehicle control system 140 to operate the mechanical and/or electromechanical components of the vehicle 100 such as an engine, transmission, steering system and braking system.

The sensor system 110, machine learning system 120, path planning system 130 and the vehicle control system 140 may be individually or in combination be realized, at least in part, in one or more processing units of the vehicle 100. The present disclosure describes parts of the machine learning system 120 being used for performing object detection and localization. In some examples, one or more other systems of the vehicle 100 (e.g., the path planning system 130 and/or the vehicle control system 140) may also be implemented using machine learning. For simplicity, the present disclosure describes the path planning system 130 and the vehicle control system 140 as being separate from the machine learning system 120; however, it should be understood that the path planning system 130 and/or the vehicle control system 140 may be implemented as part of the machine learning system 120. Further, the machine learning system 120 may, in some contexts, be also described as a machine learning module.

Figure 2:
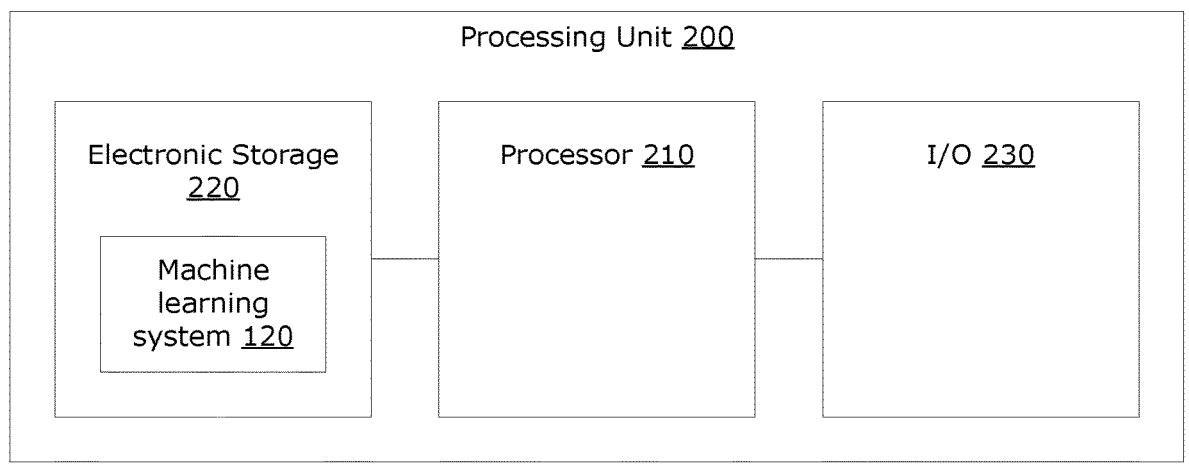
FIG. 2 is a block diagram illustrating some components of an example processing unit used to implement a machine learning-based system which may be used of the autonomous vehicle of FIG. 1.

By way of example, FIG. 2 shows illustrates an example of a processing unit 200 that may be used to implement one or more components of the vehicle 100. For example, the processing unit 200 may be used to implement the machine learning-based system 120. The processing unit 200 may also be external of the vehicle 100, for example for training and/or testing of the machine learning-based system without operating the vehicle 100 in a real-world environment.

In this example, the processing unit 200 includes one or more physical processors 210 (e.g., a microprocessor, graphical processing unit, digital signal processor or other computational element) coupled to an electronic storage 220 and to one or more input and output interfaces or devices 230. The electronic storage 220 can include tangible memory (for example flash memory) and transient memory (for example RAM). The tangible memory(ies) may store instructions, data and/or software modules for execution by the processor(s) to carry out the examples described herein, such as to implement the machine learning system 120 (and the sub-modules of the machine learning system 120). The electronic storage 220 may include any suitable volatile and/or non-volatile storage and retrieval device(s). The electronic storage 220 may include one or more of random access memory (RAM), read only memory (ROM), hard disk, optical disc, subscriber identity module (SIM) card, memory stick, secure digital (SD) memory card, and the like.

The present disclosure describes examples for processing data points of point clouds received from a DAR sensor into a set of ordered feature vectors, which can be provided as input to, for example, an interference sub-module of a machine learning based system. The interference sub-module is configured to receive the set of ordered feature vectors as input and perform an inference task, for example, a pattern recognition task such as object detection or sematic segmentation.

Figure 3A:
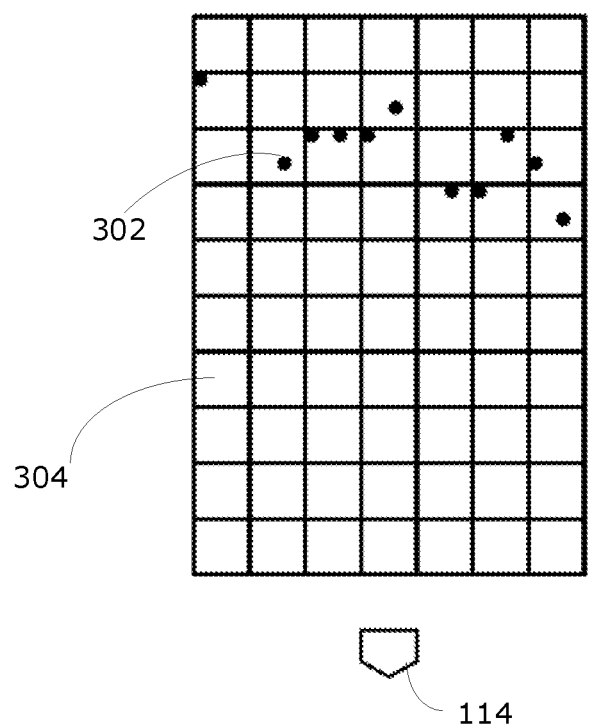
FIGS. 3A and 3B are schematic diagrams illustrating conventional approaches for representing and preprocessing point clouds provided by DAR sensors.

To assist in understanding the present disclosure, a brief discussion of the state of the art is first provided. One conventional approach is illustrated in FIG. 3A. For example, a LiDAR sensor of the LiDAR unit 114 may capture a set of data points 302 which form a point cloud. The point cloud is summarized by grouping data points 302 by cuboids (also referred to as voxels 304) that contain them. Generally, a voxel 304 defines a volume of 3D space with the shape of a cuboid; a voxel may be regularly shaped or mathematically defined, for example. These voxels 304 fill a predefined space (in 3D), also referred to as a 3D grid, scanned by the LiDAR sensor of the LiDAR unit 114. Normalization and other functions are typically applied to each voxel 304 to aggregate the data points 302 with neighboring or local information, and an output representation of coordinates and feature vectors is produced, encoding such 3D grid or lattice, in Cartesian coordinates. An example of the approach illustrated in FIG. 3A is used by machine learning methods such as VoxelNet (e.g., as described by Zhou et al., "VoxelNet—End-to-End Learning for Point Cloud Based 3D Object Detection," *CVPR*, 2018). An example feature vector, as the VoxelNet authors describe, that may be defined using this approach is:

$$[(x,y,z),l,(x-c_x,y-c_y,z-c_z)]$$

where x, y, z are the Cartesian coordinates of a given data point in 3D space, l is intensity, and $c_x$, $c_y$, $c_z$ are the Cartesian coordinates of the centroid of the points in the voxel containing the given data points.

Figure 3B:
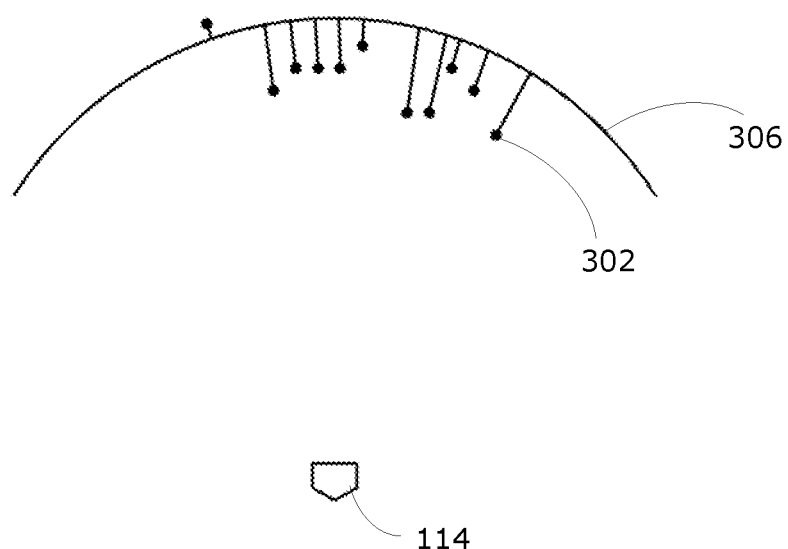

Another conventional approach is illustrated in FIG. 3B. In this approach, a transformation is applied that maps the data points of a point cloud to a 2D surface representing the front view (FV) of a LiDAR sensor of the LiDAR unit 114 (other approaches may also use the bird's-eye-view, BEV). In the example shown, the data points 302 are mapped to a curved 2D surface 306. Information is added to output feature vectors by appending depth or other information to every data point 302 in the output 2D map. An example of the approach illustrated in FIG. 3B is the one used by the authors of SqueezeSeg (e.g., see Wu et al., "SqueezeSegV2: Improved Model Structure and Unsupervised Domain Adaptation for Road-Object Segmentation from a LiDAR Point Cloud," *arXiv.org*, September 2018. An example feature vector that may be defined using this approach is:

$$[(x,y,z),l,r]$$

where r is defined as $$r=\sqrt{x^2+y^2+z^2}$$

Another approach combines the two approaches illustrated in FIGS. 3A and 3B.

Figure 4:
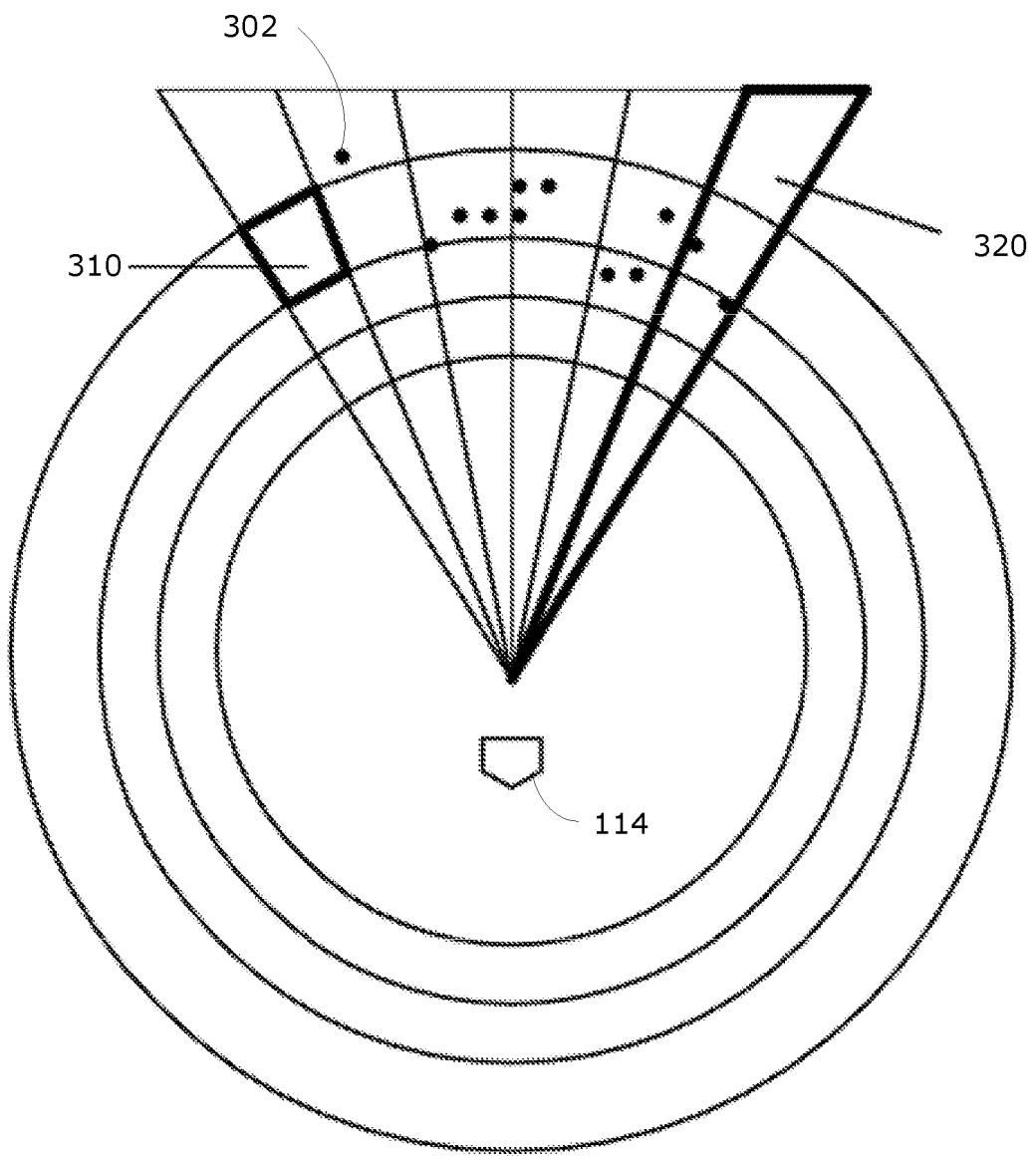
FIG. 4 is a schematic diagram illustrating an example approach for representing and preprocess point clouds, in accordance with examples of the present disclosure.

In contrast to the conventional approaches described above, the examples described herein provide (1) an ordered representation of data points of a point cloud on a 3D layout that is (2) ordered along one or more dimensions based on a spherical representation of each data point and their membership to the units of a spherical 3D layout. FIG. 4 illustrates a top-down view of how data points 302 may be grouped into voxelrays 310, which are small volumes of space (otherwise known as 3D bins) defined using spherical coordinates. This spherical basis for representation may be a better representation of the ray-scanning properties of the DAR sensor and the point cloud formation process of the DAR sensor, than the conventional voxels 304 defined using Cartesian coordinates shown in FIG. 3A. Data points are grouped and sorted by voxelrays 310 from a well-defined 3D grid or lattice. Within a set of voxelrays 310 that share, for example, an azimuth and polar channel (referred to herein as a beam 320), data points are ordered to enable extraction of features using feature extraction operations that include signal processing operations that can be performed on evenly spaced and sequential data points. Feature extraction operations can thus perform spatially meaningful signal processing operations to exploit frequency information of the spatial domain. For simplicity, FIG. 4 illustrates the 3D lattice for only a portion of the 3D space; it should be understood that the 3D lattice may be defined for the entire 3D space captured or scanned by the DAR sensor, such as a radar sensor of the radar unit 112 or a LiDAR sensor of the LiDAR unit 114, or may be defined only for a portion of the 3D space captured or scanned by the DAR sensor.

Figure 5:
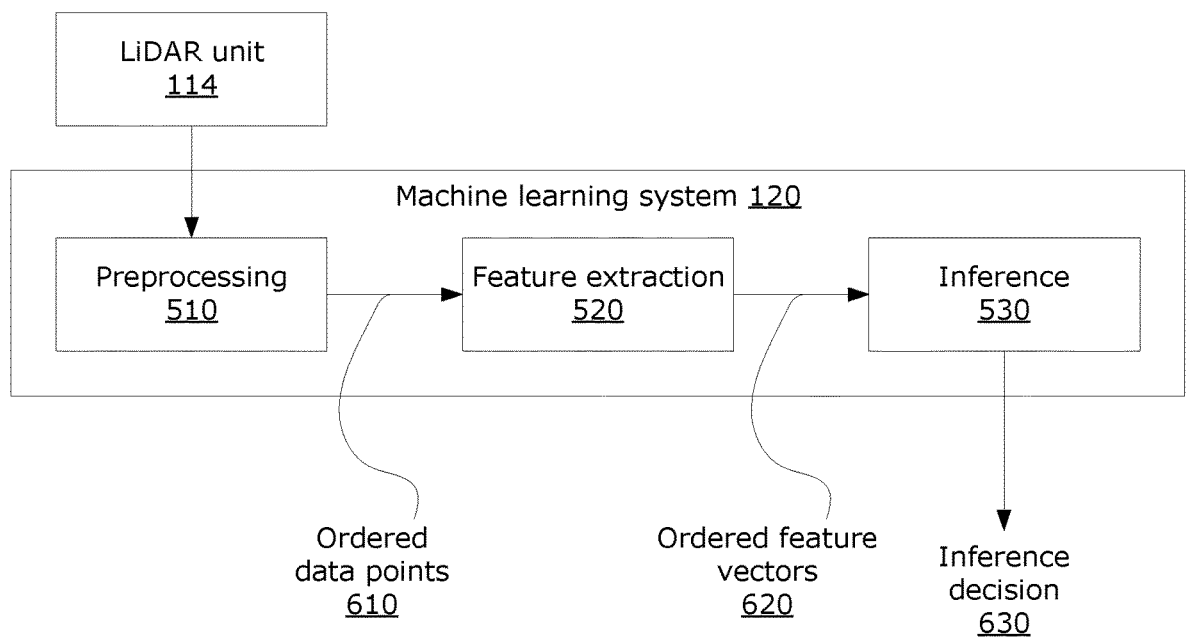
FIG. 5 is a block diagram illustrating sub-modules of the machine learning-based system of FIG. 1 and FIG. 2.

FIG. 5 illustrates example sub-modules involved in an example of the machine learning system 120, in accordance with examples disclosed herein. For simplicity, FIG. 5 shows the machine learning system 120 receiving sensor data in the form of point clouds directly from a LiDAR sensor of the LiDAR unit 114; in some examples, sensor data in the form of point clouds generated by the LiDAR sensors in the LiDAR unit 114 may be processed (e.g., filtered) by the sensor system 110 and provided to the machine learning system 120 via the sensor system 110. The LiDAR unit 114 generates a point cloud containing 3D data points representing a 3D environment.

In the example of FIG. 5, the machine learning system 120 includes a preprocessing sub-module 510, a feature extraction sub-module 520 and an inference sub-module 530. The functions of the sub-modules 510, 520, 530 may be implemented as three separate sub-modules as shown, or may be implemented using a fewer or greater number of sub-modules. The sub-modules 510, 520, 530 are exemplary, and the example methods disclosed herein may be implemented using a different system architecture and are not intended to be limited by the examples illustrated.

Generally, the pre-processing sub-module 510 is designed using information about the design specifications of the DAR sensor. This information about the design of the DAR sensor is available in the datasheet sheet provided by the manufacturer of the DAR sensor. In some embodiments, the DAR sensor may be able to provide the information regarding to downstream feature extraction and inference sub-modules. This information regarding the design specifications of the DAR sensor may include the minimum and maximum range of the DAR sensor, the horizontal and vertical resolution of the DAR sensor (e.g. the number of channels the DAR sensor has), and a field of view of the DAR sensor. This information is used to define a 3D lattice or grid for partitioning a 3D space captured or scanned by the DAR sensor. The pre-processing sub-module 510 partitions the 3D space using the 3D lattice into a plurality of small volumes (e.g. 3D bins) defined in spherical coordinates. As mentioned above, these small volumes (e.g. 3D bins) are referred to as voxelrays. The preprocessing sub-module 510 also processes the sensor data (e.g. the point cloud) received from the DAR sensor by adding metadata for the feature extraction sub-module 520, if necessary. The metadata added by the pre-processing module includes information related to the data points of the point cloud and the 3D lattice's representation. The output of the preprocessing sub-module 510 is a set of ordered data points 610 and metadata that typically includes information relating the data points and the 3D lattice's representation. The feature extraction sub-module 520 calculates features from the set of ordered data points 610 and uses metadata to assemble the output as a set of ordered feature vectors (also referred to as ordered augmented data points) 620 and metadata, where the metadata includes information relating the feature vectors and the 3D lattice's representation or 3D grid, for the inference sub-module 530. As will be discussed further below, the set of ordered data points 610 and the set of ordered feature vectors 620 are each ordered using spherical-based representation of 3D space. The inference sub-module 530 may receive the output from the feature extraction sub-module 520 (e.g., the set of ordered feature vectors 620 and metadata) as an input, perform an inference task, and output an inference output 630. For example, the inference sub-module 530 may be a machine-learning based classifier implemented using a neural network that receives the set of ordered feature vectors 620 and outputs an object label or class. Alternatively, the inference sub-module 530 may be a machine-learning based segmentation system that receives the set of ordered feature vectors 620 and outputs a mask specifying the segmented road ahead. Other types of inference tasks performed by the inference sub-module 530, including pattern recognition tasks, would be apparent to a person skilled in the art, and thus are not described in detail. The inference output 630 may be provided to other systems (e.g., the path planning system 130) in the vehicle 100.

Although FIG. 5 shows an example embodiment in which the machine learning system 120 receives sensor data in the form of points clouds from LiDAR sensors of a LiDAR unit 114, in alternative embodiments, the machine learning system 120 may receive sensor data in the form of point clouds directly from any type of DAR sensor, for example, a ray-scanning DAR sensor such as radar sensor, or another type of DAR sensor such as sonar sensor. In some example embodiments, the DAR sensor may produce continuous signals representing ranging data, in contrast to point clouds which are discrete. In this embodiment, the DAR sensor may provide the continuous signals to the sensor system 110. The sensor system 110 may sample the continuous signals to obtain data points that are representative of a point cloud, and the data points to the machine learning system 120. In other example embodiments, the DAR sensor may directly sample the continuous signals to obtain data points that are representative of a point cloud, and output point cloud to the machine learning system 120. In other example embodiments, instead of directly providing sensor data to the machine learning system 120, the sensor data provided by the DAR sensor may be stored, for example, in one or more storage devices, and the machine learning system 120 may obtain the sensor data from the one or more storage devices.

Figure 6:
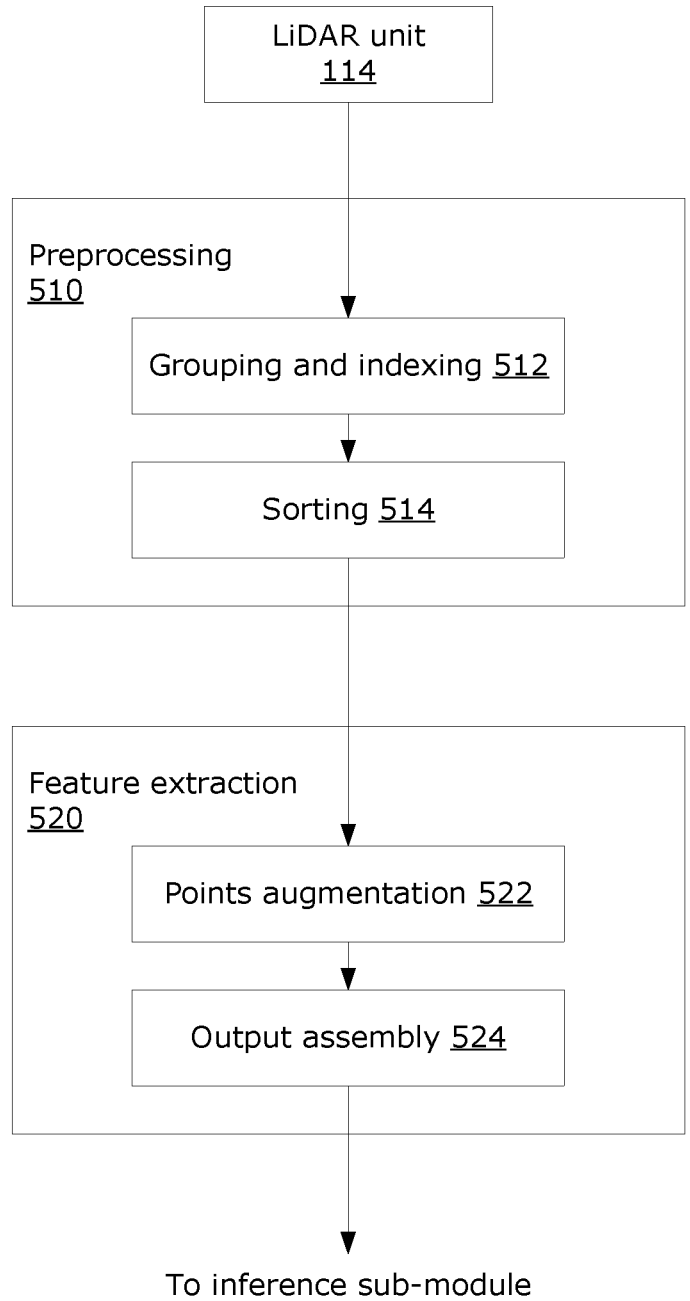
FIG. 6 is a block diagram showing further details of some of the sub-modules of FIG. 5.

FIG. 6 illustrates in greater detail some functions performed by the preprocessing sub-module 510 and the feature extraction sub-module 520 of the machine learning system 120. Although the example of FIG. 6 associates certain functions with a specific one of the sub-modules 510, 520, it should be understood that the functions may be implemented using different sub-modules, or may be implemented using a fewer or greater number of sub-modules. The example methods disclosed herein may be implemented using a different system architecture and are not intended to be limited by the examples illustrated.

In the example shown, the preprocessing sub-module 510 performs the functions of grouping and indexing 512, and sorting 514; the feature extraction sub-module 520 performs the functions of points augmentation 522 and output assembly 524.

The preprocessing sub-module, prior to performing the function of grouping and indexing 512, loads from a storage device a previously defined 3D lattice, or specifications regarding the definition of the 3D lattice. Alternatively, the pre-processing module may define a 3D lattice utilizing the information regarding the DAR sensor specifications provided by the DAR sensor to provide a spherical-based representation of the 3D space captured or scanned by a DAR sensor, such as the LiDAR sensor of the LiDAR unit 114. The 3D lattice (which may also be referred to as a 3D grid) is used to define a set of 3D bins. As mentioned above, each 3D bin or volume is defined using spherical coordinates, and is referred to as a voxelray (to distinguish over conventional voxels 304 shown in FIG. 3A which are defined using Cartesian coordinates).

The grouping and indexing function 512 assigns each data point in the point cloud to a particular voxelray, and the sorting function 514 orders the data points within a beam (i.e., a defined group of voxelrays with, for example, related or shared azimuth and/or polar intervals and/or range). This may be achieved by sorting the data points within the beam. In some examples, the DAR sensor may encode ordering in the data points and thus the sorting function 514 may not be performed on the data points with the beam. Instead, a simple assignment of each data point to an index within the beam may instead be used to yield the desired ordering. The output of the preprocessing module 510 are the set of ordered data points produced by the ordering in module 514 and the metadata extracted by the grouping and indexing submodule 512 may also include metadata extracted by the ordering performed in 514, and optionally metadata related to the DAR sensor. This is the metadata output by the preprocessing sub-module 510, which may include the spatial relationship of the points to the 3D lattice, and the spatial relationship of the points within each voxelray or set of voxelrays (i.e., a beam). Using the set of ordered data points, the points augmentation function 522 performs one or more feature extraction operations on each data point using the metadata output by the pre-processing module 610 that includes information about spatial neighbors of the data point, and the spatial neighbors themselves to generate a feature vector and metadata for each data point. This metadata generated for each data point includes the relevant indexing or spatial coordinates for the feature vectors so that they are placed properly on the 3D lattice by the following submodule 524, and it may include any relevant information extracted within the modules 510 and 520 that may be used by downstream inference submodule 530. The assembly function 524 generates an output of ordered feature vectors by assigning each feature vector to a corresponding voxelray. The assembly function 524 may assign each feature vector to a specific spatial location within the corresponding voxelray according to the order of the original data points, and according to the defined spherical-based 3D lattice. The assembled output may also be referred to as an assembled beam-grid.

As mentioned above, FIG. 4 shows a top-down view of an example 3D lattice defining the 3D space captured or scanned by DAR sensor (e.g., a radar sensor of the radar unit 112, a LiDAR sensor of the LiDAR unit 114, or another type of ray-scanning DAR sensor). The DAR sensor generates a point cloud containing data points 302 in 3D space. The point cloud may be defined by:

$$P=\{p_n\} \text{ where } n=0,\ldots,N-1$$

where $p_n$ is the n-th data point in point cloud P having N data points. Each data point, $p_n$, may be represented as a 3D location defined in Cartesian coordinates as follows:

$$p_n=(x,y,z)$$

The 3D location of the data point, $p_n$, can be represented, alternatively, in polar coordinates as follows:

$$p_n=(r,\rho,\theta)$$

where r is the distance to the DAR device, defined as:

$$r=\sqrt{x^2+y^2+z^2}$$

and where $\rho$ is the azimuth angle, and $\theta$ is the polar or zenith angle. In this example, coordinates have an origin at the location of the DAR sensor. Spherical representation of the data points may be a better representation (compared to Cartesian representation) of the information captured by ray-scanning DAR sensors such as LiDAR or radar sensors. Furthermore, by using a spherical-based 3D lattice, all the data points of the point clouds obtained by the DAR sensor are accounted for, in contrast with a square grid in the Cartesian-based approach. This is because a voxelray (i.e. a volume defined using spherical-based representation of the 3D space) provides a better representation of a section of the 3D space that is naturally scanned by the DAR sensor.

As illustrated in FIG. 4, a voxelray 310 may have a shape geometrically similar to a frustum and different voxelrays 310 may have different dimensions, in contrast to a conventional voxel (e.g., voxel 304 shown in FIG. 3A) which typically has a cube or rectangular prism geometry and typically constant dimensions. It should be noted that a beam 320 is defined as a group of voxelrays 310, in such a way that data points 302 can be ordered in a given spatial dimension within each beam 320. This ordering may enable useful features to be extracted because signal processing operations utilized to perform feature extraction functions may require such ordering and the local (neighbors) information that this ordering provides. This is likely to help with inference tasks performed by the inference sub-modules of the machine learning-based system 120 (e.g., pattern recognition task).

In some examples, the present disclosure defines a mathematical representation of the beam grid. The beam grid may be thought of as the bins and edges of a histogram in 3D, where data points in a point cloud may lie in respective 3D bins (i.e., voxelrays). For example, a typical LiDAR sensor scans the 3D environment over a plurality of defined channels, where each channel scans over a 2D plane, for example, the radius-azimuth plane. As mentioned above, FIG. 4 shows the top-down view of one such plane. Depending on the LiDAR sensor, there may be 8, 16, 32 or more channels. Thus, for point cloud data obtained using a LiDAR sensor (e.g., LiDAR unit 114 having one or more LiDAR sensors, or a radar unit 112), $\theta$ has defined values $\theta_k$, where k is the index of the k-th LiDAR channel out of a total of K channels. On this basis, the polar axis may be divided into intervals as follows:

$$b_{\theta_k}=[\theta_k-\Delta_{\theta_k},\theta_k+\Delta_{\theta_k}] \; k=0,1,\ldots,K-1$$

where all points $p_n=(r_n,\rho_n,\theta_n)$ with $|\theta_n-\theta_k|<\Delta_{\theta_k}$ lie, for a collection of defined $(\theta_k,\Delta_{\theta_k})$. This collection of intervals represents the channels in the LiDAR sensor having K channels. The parameter $\Delta_{\theta_k}$ represents a small polar angle, which may be selected to correspond to the polar resolution of the DAR device. The parameter $\Delta_{\theta_k}$ may vary depending on $\theta_k$, or may be constant. Generally, parameter values for defining the 3D lattice, voxelrays and beams may be selected as desired, for example to match the characteristics of the DAR device.

The intervals $b_{\theta_k}$ define partitions that span the polar axis, covering the point cloud P totally or partially. Where the point cloud P is partially covered by the intervals $b_{\theta_k}$, it may be that the intervals $b_{\theta_k}$ have been defined to cover only a portion of interest along the polar axis.

Partitions may be similarly defined in the radial direction r and in the azimuth direction $\rho$. The r-axis may be partitioned into I intervals and the azimuth axis may be partitioned into J intervals, where the values of I and J may be selected as desired, for example based on the radial and azimuthal resolutions of the DAR device. The radial and azimuthal intervals may be defined as follows:

$$b_{r_i}=[r_i-\Delta_{r_i},r_i+\Delta_{r_i}] \; i=0,1,\ldots,I-1$$

$$b_{\rho_j}=[\rho_j-\Delta_{\rho_j},\rho_j+\Delta_{\rho_j}] \; j=0,1,\ldots,J-1$$

where $\Delta_{r_i}$ represents a small distance along the r-axis, and $\Delta_{\rho_j}$ represents a small azimuthal angle, both of which may vary along their respective axis or which may be constant. The values of $\Delta_{r_i}$ and $\Delta_{\rho_j}$ may be selected as desired, for example based on the radial and azimuthal resolutions of the DAR device.

Based on the above definitions, the beam-grid B may be defined with 3D sections formed with partitions in spherical coordinates as follows:

$$B \triangleq B_{r\rho\theta}=\{(b_{r_i},I),(b_{\rho_j},J),(b_{\theta_k},K)\} \; \forall (i,j,k)$$

and a voxelray may be defined as the 3D section indexed by (i,j,k) as follows:

$$v_{ijk}=V_{r_i\rho_j\theta_k}=(b_{r_i},b_{\rho_j},b_{\theta_k})$$

It should be noted that the voxelrays may be defined to be non-overlapping (e.g., as in the example illustrated in FIG. 4) or overlapping. For example, a grid with overlapping voxelrays is one for which two adjacent centers of intervals in an axis are closer than twice the distance of each center to the edge of its respective interval. So far, known methods (e.g., discussed above with reference to FIG. 3) have focused on non-overlapping 3D bins defined in Cartesian coordinates, but overlapping 3D bins may provide a more robust representation that may capture better the nature of the features of real objects encoded in the set of data points. The present disclosure may lend itself to either approach.

Having defined the 3D lattice for partitioning the 3D space, the preprocessing sub-module 510 may perform the grouping and indexing function 512 by grouping together all data points within the 3D section defined by a given voxelray, and indexing the data points using the index of the given voxelray. An example expression of this mathematically is that for every voxelray $v_{ijk}$ in the beam-grid B, any data point $p_n$ contained in the voxelray $v_{ijk}$ is indexed and stored as $(p_n,(i,j,k))$. In this example, what is stored is the tuple of the data point itself and its membership assignment to one or more voxelrays of the 3D lattice. The latter may be expressed simply with the indices on each dimension for the voxelray, but may be expressed in other ways, as long as the membership of the data point to a 3D voxelray in the 3D lattice is clear.

Additionally or alternatively, data points may be grouped and indexed into beams. A beam may be indexed by m where $m \leftarrow (j,k)$, and is the group of voxelrays having a common azimuth interval $\rho_a$ and a common polar interval $\theta_b$. For example, a beam $B_m$ may be defined as follows:

$$B_m = \{v_{ijk}\}|_{j=a,k=b} = \cup V_{r_i \rho_a \theta_b} \forall i$$

where the operator $\cup$ means the union over the voxelrays, and the boldface indicates a set.

Having defined the beams, the preprocessing sub-module 510 may perform the grouping and indexing function 512 by grouping all data points within the 3D section defined by a given beam, and indexing the data points using the index of the given beam.

An example expression of this mathematically is that for every beam $B_m$ in the beam-grid B, any data point $p_n$ contained in the beam $B_m$ is indexed and stored as $(p_n,(j,k))$ such that $p_n \in (b_{\rho_j}, b_{\theta_k})$.

Another example, expressed in pseudocode is as follows:
FOR EVERY beam IN beam-grid
   FOR EVERY point IN beam
      store $(p_n,(j,k))$ such that $p_n \in (b_{\rho_j}, b_{\theta_k})$ In some cases, the grouping and indexing function 512 may group and index data points into beams using a hash table, with (j,k) as hash keys. An example expression of this mathematically is that the hash table may be defined as a table M with hash keys j and k, and data points may be assigned by:

$$M_{jk} \leftarrow p_n \text{ if } p_n \in (b_{\rho_j}, b_{\theta_k}) \forall p_n$$

where the assignment operator $\leftarrow$ means that the data point $p_n$ is aggregated to the contents of the cell $M_{jk}$ in the table M.

After the data points have been grouped and indexed by beams, the sorting function 514 orders the data points within a given beam, for example, using a simple conversion operation of the point themselves, or using a sorting operation if necessary. For example, depending on the DAR sensors, the data points may already be sorted along the azimuth axis. Sorting may also be performed along other directions, for example depending on the direction of the local pattern (discussed further below) that is to be determined. Sorting data points within a given beam usually will be more efficient than sorting data points over an entire channel or over the entire point cloud. An example expression of this mathematically is that for beam $B_m$ in the beam-grid B, the data points $p_n$ contained in the beam $B_m$ are sorted and ordered along the azimuth direction. The ordered data points are stored in a sorted point cloud $S_B$. Where the data points have been indexed using a hash table M, the sorting may be performed by the operation:

$$M_{jk} \leftarrow \text{sort}_p(M_{jk}) \forall j,k$$

Where the hash table M is used, the hash table M may be outputted as the data structure that implements the sorted point cloud $S_B$.

Another example, expressed in pseudocode, is as follows:
FOR EVERY beam INDEXED BY m=(j,k) IN beam-grid
   GET points IN beam
   SORT points along the azimuth axis
   SAVE sorted points
DEFINE the new sorted point cloud as a new sorted cloud $S_B$ In some examples, it may not be necessary to perform a sorting function along the azimuth axis. For example, if the number of azimuth locations scanned by the LiDAR sensor is finite (e.g., if it is known that the LiDAR sensor obtains scans at the same azimuth locations at each 360° scan), then sorting the data points may involve simply grouping data points according to the azimuth index (with the assumption that data points having the same azimuth index correspond to the same azimuth location). Similarly, sorting along other directions may involve grouping based on index.

Figure 7A:
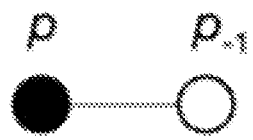
FIGS. 7A-7D are schematic diagrams illustrating some example local patterns for determining neighborhood information, which are a way of specifying the order of points relative to neighbors.
Figure 7B:
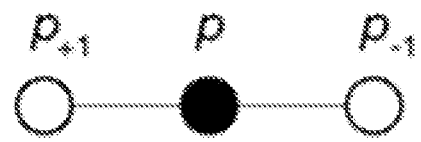
Figure 7C:
Figure 7D:
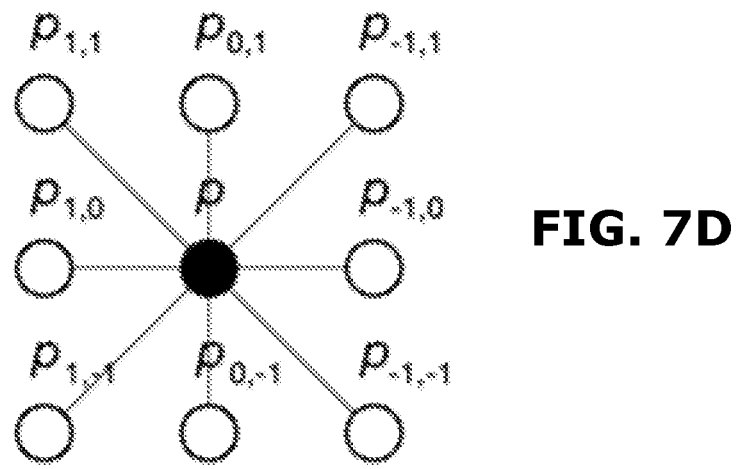

The ordered data points (e.g., in the form of the sorted point cloud $S_B$) may be inputted to the feature extraction sub-module 520. The feature extraction sub-module 520 performs the points augmentation function 522, which augments the ordered data points with feature vectors. The feature vectors may be generated using a defined set of one or more feature functions. The feature function(s) applied by the points augmentation function 522 may include functions that perform operations defined in a local neighborhood of each data point. This may require defining a local pattern that represents the neighbors of each data point, in terms of locations, and the operations to be done. For example, a set of defined local patterns D (also referred to as a dictionary of local patterns) and a set of defined feature functions or operations O (also referred to as a dictionary of operations), can be written as $$D = \{d_u\} \ u=0, 1, \ldots$$

$$O = \{f_v\} \ v=0, 1, \ldots$$

where $d_u$ is a local pattern and $f_v$ is a feature function. A local pattern is a description of one or more neighboring locations of a given data point, according to a defined relationship. Applying a local pattern to a given data point may include identifying one or more neighbors of the data point according to a local neighbor relationship, for example by determining whether a neighbor is present and possibly, if necessary for a given operation in O, determining the index of the neighbor. FIGS. 7A-7D illustrate some examples of local patterns that may be defined in D. These may be for example be applied as the points are processed in a frontal-view fashion of the DAR device. FIG. 7A illustrates a local pattern that determines one preceding neighbor in the azimuth direction at a given zenith channel; FIG. 7B, similarly, illustrates a local pattern that determines one preceding neighbor and one subsequent neighbor in the azimuth direction; FIG. 7C illustrates a local pattern that determines two preceding neighbors and two subsequent neighbors in the azimuth direction; and FIG. 7D illustrates a local pattern that determines one preceding neighbor and one subsequent neighbor in both azimuth and polar directions. Other local patterns may be defined in D, for example to cover different neighbor distances including local patterns that may cover the whole of a beam, or portions of a beam. Some examples of feature functions include:

centroid subtraction: $f_0(p_n)=p_n-c_m$ first derivative: $f_1(p_n)=p_n-p_{n-1}$ second derivation: $f_2(p_n)=p_n-2*p_{n-1}+p_{n-2}$ relative occupancy: $f_3(p_n)=g(p_n,D)$ where $c_m$ is the centroid of the data points belonging to the beam $B_m$ or voxelray containing the data point $p_n$, and g is a function encoding relative occupancy (which may be defined using one or more local patterns defined in D). It should be noted that functions $f_1$ and $f_2$ may also implicitly use local patterns defined in D. Other feature functions may be defined in O, including feature functions that may include calculations using higher order moments. In some examples, the feature functions defined in O may be limited to functions that operate within a single beam. That is, the feature functions defined in O may not include any functions that require information about neighbors in another beam. This limitation may help to restrict the number of data points that need to be considered, which may help to improve computational efficiency.

The local patterns defined in D may be defined depending on the information needed to calculate the feature functions defined in O. For example, if a feature function defined in O requires information about all data points within a beam, then D may define at least one local pattern that covers the entire beam. The augmentation function 522 may first use D to extract necessary metadata of all data points in the set of ordered data points, followed by O applied to all data points. The augmentation function 522 may alternatively process one data point at a time by using one or more local patterns in D relative to such data point, followed by O applied to the given data point, then moving to process the next data point in the set of ordered data points. The calculation of a feature function for a data point (and associating the result of the calculation with that data point) may be referred to as augmenting the data point.

An example feature function may require information about preceding or subsequent neighbors of a given data point (e.g., in either azimuth axis, polar axis, or both). To obtain the required information about the neighbors of a given data point, the set of ordered data points (which may be stored in a sorted point cloud $S_B$) may be processed on a beam-by-beam basis. An example expression of this mathematically is that a local occupancy dictionary $D_{pn}$ is defined as an array containing the binary state (i.e., present or not) of each of the neighbor locations defined in a local pattern $d_u \in D$, where the local pattern is used to identify or describe the state (such as present of missing) of one or more neighbors necessary for calculating a feature function $f_v$. This information may be determined based on the specifications of the DAR device, for example the horizontal and vertical resolutions of the DAR device, which determine, respectively, all the azimuth and polar angle values possible for any point cloud obtained using the DAR device.

Consider the example where a feature function is to be calculated using information about neighbors along the azimuth axis only. If the DAR device has a horizontal (azimuth) resolution of $\delta_\rho$, then to calculate a first derivatives feature function (which is an operation that uses the preceding neighbor of a data point, based on the local pattern illustrated in FIG. 7A), it is necessary to determine the presence of a preceding neighbor $p_{n-1}$ for each data point $p_n$. In this example, n represents a discrete axis of evenly spaced samples of DAR data points in the azimuth direction (where the spacing of the samples correspond to the azimuthal resolution $\delta_\rho$ of the DAR device). However, it should be noted that the data points in the set of ordered data points may not be evenly spaced. An example expression of this mathematically is that the occupancy dictionary $D_{pn}$ for a data point $p_n$ may store the state, present or missing, $p_{n-1}$ using the sorted sequence of data points $p_k, p_{k-1}, p_{k-2}, \ldots$ (which is not necessarily evenly spaced) in the set of ordered data points $S_B$, for each beam $B_m$. An example calculation for a given available data point $p_n$ is as follows:

$$\text{state}(p_{n-1}) = \begin{cases} \text{present} & \text{if } |p_k(\rho) - p_{k-1})\rho + | \leq \delta_\rho + \tau \text{ with } p_k = p_n \\ \text{missing if otherwise} \end{cases}$$

where $p_i(\rho)$ is the azimuth coordinate of the i-th data point, and $\tau$ is a small threshold to account for noise. As illustrated in this example, a local pattern may provide occupancy information (e.g., occupied/empty patterns). Other calculations may be used depending on the feature function.

The points augmentation function 522 generates a feature vector for a given data point $p_n$ by appending the results of the feature function calculations to the data point $p_n$. Additional information may be included in the feature vector. For example, LiDAR data may include an intensity or luminance value l representing the intensity of the reflected light pulse detected by the LiDAR sensor. An example expression of this mathematically is that a feature vector $a_n$ may be generated for a point $p_n$ in the set of ordered data points $S_B$, as follows:

$a_n=\text{concat}(p_n,l,f_o(p_n), \quad f_1(p_n), \quad . \quad . \quad . \quad ,$
$\quad f_v(p_n), \ldots) \forall f_v \in O$ where the calculations for $f_v$ may be performed using information stored in $D_{pn}$, using local patterns defined in D. The "concat" operation simply places one term after another, as concatenating the feature vectors, but other forms of assembling the final feature vector are possible.

Another example, expressed in pseudocode, may be as follows:

FOR EVERY beam IN $S_B$:
  FOR EVERY $p_n$ IN beam DO:

$a_n=\text{concat}(p_n,l,f_o(p_n), \quad f_1(p_n), \quad . \quad . \quad . \quad ,$
  $\quad f_v(p_n), \ldots) \forall f_v \in O$ SAVE the augmented feature vectors $a_n$ into augmented cloud A The feature vectors $a_n$ may be stored as a set of feature vectors, for example in a vector cloud $A=\{a_n\}$ where $n=0, \ldots, N-1$. The set of feature vectors may also be referred to as a feature set.

After the feature vectors have been generated, the feature extraction sub-module 520 performs the output assembly function 524, which orders the feature vectors within the 3D lattice, for example by associating the feature vector generated for a given data point with the corresponding voxelray containing the given data point. The result is a set of ordered feature vectors. An example expression of this mathematically is that the feature vectors contained in the vector cloud A is associated with voxelrays in the beam-grid B, to generate the set of ordered feature vectors C, defined as the set of pairs:

$C=\{(a_n,v_{ijk})\} \forall a_n \in A$ and $v_{ijk} \in B$

In some cases, this operation may be implemented using a hash table T having indexes (i,j,k) encoding the voxelray coordinates as hash keys. An example expression of this mathematically is that the hash table T (which may be used to implement C) may be generated by:

$$T_{ijk} \leftarrow a_n \text{ if } a_n \in v_{ijk} \; \forall a_n \in A \text{ and } v_{ijk} \in B$$

where the operation ← aggregates $a_n$ to the contents of the cell $T_{ijk}$ in the hash table T.

Figure 8:
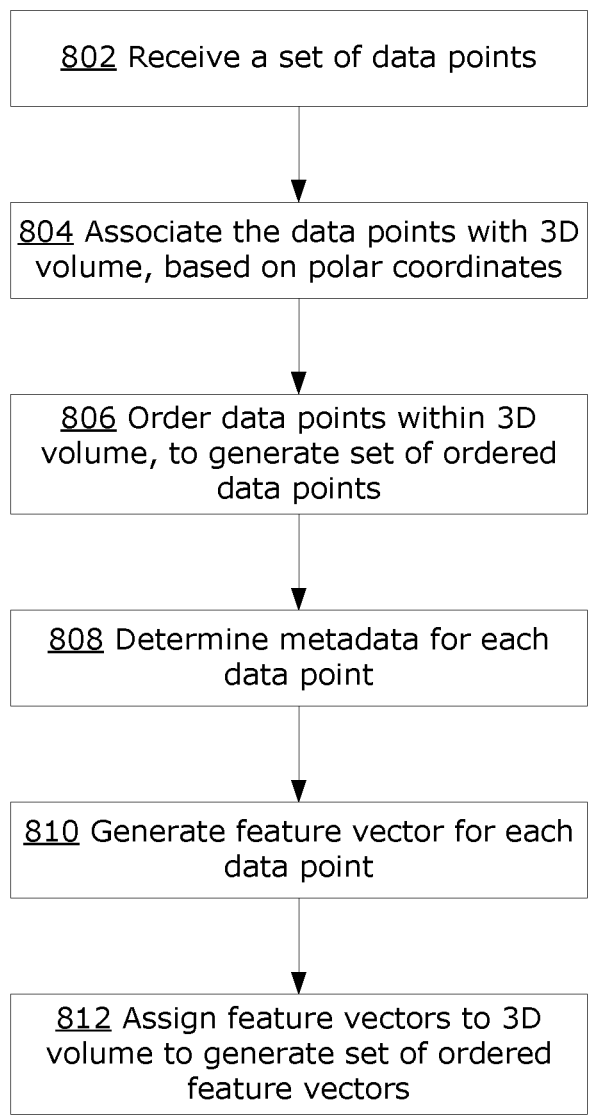
FIG. 8 is a flowchart illustrating an example method for generating ordered representation of point cloud data, and performing feature extraction.

FIG. 8 is a flowchart illustrating an example method 800 that may be performed by a machine learning based system (e.g., using the preprocessing sub-module 510 and feature extraction sub-module 520, and their respective functions as described above). The method 800 may be used to implement the functions described above with respect to FIG. 6. The method 800 may be performed in real-time on point clouds received from DAR sensors (e.g., from DAR sensors of an autonomous vehicle operating in the real-world environment) or may be performed on previously-acquired point clouds that are stored in one or more storage devices, or may be performed on synthetically generated point clouds, among other examples. The method 800 may be implemented using one or more equations and/or pseudocode described above.

At action 802, a point cloud is received. The point cloud includes a plurality of data points with each data point representing a 3D location in 3D space and optionally an intensity of the data point and/or a time of detection of the data point. The point cloud may be generated using a DAR sensor, such as a LiDAR sensor of the LiDAR unit 114 of the autonomous vehicle 100. In some examples, receiving the point cloud may include obtaining the point cloud using the DAR sensor. In some embodiments, receiving the point cloud may include retrieving the point cloud from one or more storage devices that stores point clouds previously obtained by DAR sensors of an autonomous vehicle during the vehicle's operation. For example, a DAR sensor of the vehicle 100 may provide points clouds when operating the vehicle 100 in various different environments, and these point clouds may be stored on external processing for later processing.

At action 804, each data point is associated with a respective voxelray, based on spherical coordinates of the data point. Additionally, a voxelray may be part of a beam, based on a spherical-based 3D lattice that partitions a 3D space using spherical coordinates (having a predetermined origin, such as the DAR sensor as the origin). In some examples, the spacing of the 3D lattice is dependent on the information regarding the design specifications of the DAR sensor which includes the resolution of the DAR sensor. As in the case defined above, a beam may be formed from one voxelray, or by two or more adjacent voxelrays, along one dimension (e.g., along the radial axis) of the spherical-based 3D lattice. Action 804 may be performed to implement the grouping and indexing function 512 illustrated in FIG. 6.

At action 806, the data points within a given beam are ordered along at least one dimension of the 3D lattice (e.g., in the azimuthal direction). For example, the ordering may involve performing a sorting function, or the sorting may involve grouping the data points according to an index along one direction. The ordering may be performed for all beams defined for the 3D space. The result is a set of ordered data points within beams in the 3D lattice, which may be stored as an ordered point cloud or in the form of a hash table, for example. The set of ordered data points may be stored for further processing and/or may be directly provided as input for performing feature extraction. Action 806 may be performed to implement the sorting function 514 illustrated in FIG. 6.

At action 808, neighborhood information is determined for each data point. As discussed above, determining neighborhood information may involve determining occupancy of one or more neighbor positions, according to one or more defined local patterns. This neighborhood information may be used for calculating one or more features for the data point.

At action 810, a feature vector is generated for each data point. The feature vector is generated by calculating one or more features for the data point (using one or more defined feature functions), and associating (e.g., concatenating or appending) the calculated feature(s) with the data point. Actions 808 and 810 may be performed to implement the points augmentation function 522 illustrated in FIG. 6.

At action 812, the feature vectors are ordered according to a spherical-based 3D lattice, or beam-grid as defined above. The ordering may involve associating or indexing the feature vector for a given data point with the respective voxelray and/or beam to which the data point belongs. The result is a set of ordered feature vectors with a beam-grid partition membership. The set of ordered feature vectors may be stored as a vector cloud or in the form of a hash table, for example. Action 812 may be performed to implement the output assembly function 524 of FIG. 6.

The set of ordered feature vectors may then be provided to an inference sub-module 530 of the machine learning system 120, and the inference sub-module 530 uses the set of ordered feature vectors to perform an inference task.

The present disclosure describes example methods and systems for generating an ordered representation of data points of a point cloud, as well as feature extraction performed on the ordered representation of data points of the point cloud. The disclosed examples use a spherical-based representation of a 3D space, to provide a 3D lattice (also referred to as a beam-grid, spherical grid or spherical lattice) giving specific membership to each data point according to its location within the 3D lattice. The disclosed examples use 3D bins or volumes of the 3D space defined above as voxelrays and beams, which are defined using spherical coordinates, as the basis for ordering data points and assigning membership. The ordering of data points may enable determination of neighbors and other local patterns.

In examples disclosed herein, feature extraction may be performed on the basis of neighboring points (which may be determined prior to applying feature functions). Feature functions may be calculated over data points included within a single voxelray or beam.

In examples disclosed herein, the result of ordering and feature extraction may be provided as output tuples of feature vectors and metadata indicative of voxelray membership.

In examples disclosed herein, hash tables may be used to implement various calculations and/or data structures.

The present disclosure describes examples implemented in the context of autonomous vehicles using a DAR sensor (e.g., LiDAR and/or radar). The disclosed examples may also be applicable in other contexts. For example, the present disclosure may be applicable in pattern recognition tasks, such as in the field of remote sensing or any other area that uses a DAR or ray-scanning device to acquire data which may be represented in a 3D lattice.

The present disclosure describes example methods and systems that may provide an ordered representation of 3D data, which may be used to provide more meaningful features for processing by machine learning modules (e.g., for performing inference tasks).

The present disclosure also describes example methods and systems that enable more efficient representation of a set of data points of a point cloud obtained by a DAR sensor, such as a LiDAR or radar sensor, and may convey information which is more representative of the capabilities (and limitations) of such a DAR sensor to subsequent machine learning inference tasks. This may enable higher accuracy in subsequent machine learning inference tasks, such as object detection (including object classification and localization). The methods disclosed herein may provide savings on computational efficiency, compared to conventional approaches using 3D voxel grids.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
receiving a point cloud having a plurality of data points each representing a 3D location in a 3D space, the point cloud being obtained using a detection and ranging (DAR) sensor;
for each data point, associating the data point with a 3D volume containing the 3D location of the data point, the 3D volume being defined using a 3D lattice that partitions the 3D space based on spherical coordinates;
for at least one 3D volume, sorting the data points within the 3D volume based on at least one dimension of the 3D lattice;
storing the sorted data points as a set of ordered data points;
performing feature extraction on the set of ordered data points to generate a set of ordered feature vectors by:
for the at least one 3D volume, calculating at least one feature for one or more data points within the 3D volume by applying at least one feature function;
generating a feature vector for each respective data point of the one or more data points by associating the at least one calculated feature with the respective data point; and
sorting the feature vectors based on the 3D lattice to generate the set of ordered feature vectors; and
providing the set of ordered feature vectors to perform an inference task.

2. The method of claim 1, wherein the 3D volume comprises two or more partitions of the 3D space, the two or more partitions being adjacent partitions along one dimension of the 3D lattice.

3. The method of claim 1, wherein performing feature extraction further comprises:
for the at least one 3D volume, determining neighborhood information for each of the one or more data points according to at least one local pattern;
wherein the neighborhood information is used in applying the at least one feature function.

4. The method of claim 1, wherein the set of ordered feature vectors is represented as a set of tuples in which each feature vector is associated with a respective partition of the 3D space.

5. The method of claim 1, wherein the 3D space is partitioned into a plurality of non-overlapping 3D volumes.

6. The method of claim 1, wherein the 3D space is partitioned into a plurality of overlapping 3D volumes.

7. The method of claim 1, wherein the DAR sensor is a ray-scanning DAR sensor.

8. An apparatus comprising:
a memory storing instructions; and
a processor coupled to the memory and configured to execute the instructions to:
receive a point cloud having a plurality of data points each representing a 3D location in a 3D space, the point cloud being obtained using a detection and ranging (DAR) sensor;
for each data point, associate the data point with a 3D volume containing the 3D location of the data point, the 3D volume being defined using a 3D lattice that partitions the 3D space based on polar coordinates;
for at least one 3D volume, sort the data points within the 3D volume based on at least one dimension of the 3D lattice;
store the sorted data points as a set of ordered data points;
perform feature extraction on the set of ordered data points to generate a set of ordered feature vectors by:
for the at least one 3D volume, calculating at least one feature for one or more data points within the 3D volume by applying at least one feature function;
generating a feature vector for each respective data point of the one or more data points by associating the at least one calculated feature with the respective data point; and sorting the feature vectors based on the 3D lattice to generate the set of ordered feature vectors; and
provide the set of ordered feature vectors to perform an inference task.

9. The apparatus of claim 8, wherein the 3D volume comprises two or more partitions of the 3D space, the two or more partitions being adjacent partitions along one dimension of the 3D lattice.

10. The apparatus of claim 8, wherein the processor is further configured to execute the instructions to perform feature extraction by:
for the at least one 3D volume, determining neighborhood information for each of the one or more data points according to at least one local pattern;
wherein the neighborhood information is used in applying the at least one feature function.

11. The apparatus of claim 8, wherein the set of ordered feature vectors is represented as a set of tuples in which each feature vector is associated with a respective partition of the 3D space.

12. The apparatus of claim 8, wherein the 3D space is partitioned into a plurality of non-overlapping 3D volumes.

13. The apparatus of claim 8, wherein the 3D space is partitioned into a plurality of overlapping 3D volumes.

14. The apparatus of claim 8, wherein the DAR sensor is a ray-scanning DAR sensor.

15. The apparatus of claim 8, wherein the apparatus is an autonomous vehicle.

16. A non-transitory computer-readable medium having instructions stored thereon, wherein the instructions are executable by a processor of an apparatus to cause the apparatus to:
receive a point cloud having a plurality of data points each representing a 3D location in a 3D space, the point cloud being obtained using a detection and ranging (DAR) sensor;
for each data point, associate the data point with a 3D volume containing the 3D location of the data point, the 3D volume being defined using a 3D lattice that partitions the 3D space based on polar coordinates;
for at least one 3D volume, sort the data points within the 3D volume based on at least one dimension of the 3D lattice;
store the sorted data points as a set of ordered data points;
perform feature extraction on the set of ordered data points to generate a set of ordered feature vectors by:
for the at least one 3D volume, calculating at least one feature for one or more data points within the 3D volume by applying at least one feature function;
generating a feature vector for each respective data point of the one or more data points by associating the at least one calculated feature with the respective data point; and
sorting the feature vectors based on the 3D lattice to generate the set of ordered feature vectors; and
provide the set of ordered feature vectors to perform an inference task.

17. The non-transitory computer readable medium of claim 16, wherein the 3D volume comprises two or more partitions of the 3D space, the two or more partitions being adjacent partitions along one dimension of the 3D lattice.

18. The non-transitory computer readable medium of claim 16, wherein the instructions further cause the apparatus to perform feature extraction by:
for the at least one 3D volume, determining neighborhood information for each of the one or more data points according to at least one local pattern;
wherein the neighborhood information is used in applying the at least one feature function.

19. The non-transitory computer readable medium of claim 16, wherein the set of ordered feature vectors is represented as a set of tuples in which each feature vector is associated with a respective partition of the 3D space.

20. The non-transitory computer readable medium of claim 16, wherein the DAR sensor is a ray-scanning DAR sensor.

21. The method of claim 1, wherein at least one feature is calculated for a plurality of data points within the 3D volume.

22. The apparatus of claim 8, wherein at least one feature is calculated for a plurality of data points within the 3D volume.

23. The non-transitory computer readable medium of claim 16, wherein at least one feature is calculated for a plurality of data points within the 3D volume.

* * * * *